(12) United States Patent
Mann (10) Patent No.: US 10,460,619 B2
(45) Date of Patent: Oct. 29, 2019

(54) METHOD AND SYSTEM OF CUSTOMIZING SCRIPTURE STUDY

(71) Applicant: Steven Thomas Mann, Lewisburg, OH (US)

(72) Inventor: Steven Thomas Mann, Lewisburg, OH (US)

(\*) Notice: Subject to any disclaimer, the term of this patent is extended or adjusted under 35 U.S.C. 154(b) by 197 days.

(21) Appl. No.: 15/620,786

(22) Filed: Jun. 12, 2017

(65) Prior Publication Data

US 2018/0357914 A1 Dec. 13, 2018

(51) Int. Cl.
*G06F 17/30* (2006.01)
*G09B 7/02* (2006.01)
*G09B 19/00* (2006.01)
*G06Q 10/00* (2012.01)

(52) U.S. Cl.
CPC .............. *G09B 7/02* (2013.01); *G09B 19/00* (2013.01); *G06Q 10/00* (2013.01)

(58) Field of Classification Search
CPC .... G06F 17/2235; G06F 17/24; G06F 3/0482; G06F 3/0484
USPC ......................................................... 434/245
See application file for complete search history.

(56) References Cited

U.S. PATENT DOCUMENTS

| 5,042,816 A * | 8/1991 | Davis ...................... A63F 3/001 273/243 |
| 5,377,991 A * | 1/1995 | Olsen ...................... A63F 3/001 273/249 |
| 5,820,125 A * | 10/1998 | Olsen ................... A63F 3/00006 273/248 |
| 6,390,015 B1 * | 5/2002 | Germano ................. B42D 9/00 116/235 |
| 8,099,375 B2 * | 1/2012 | Driessen ................ G06N 3/004 706/45 |
| 8,678,925 B1 * | 3/2014 | Kahn .................... G07C 15/008 463/1 |
| 2003/0006969 A1 * | 1/2003 | Barras ....................... G09B 5/02 345/169 |
| 2004/0036215 A1 * | 2/2004 | Butler, II ............ A63F 3/00072 273/243 |
| 2004/0044473 A1 * | 3/2004 | Leem ...................... G06F 16/68 434/156 |
| 2005/0233775 A1 * | 10/2005 | Chang ............... H04M 1/72522 455/567 |
| 2005/0243658 A1 * | 11/2005 | Mack ................... G04G 9/0064 368/223 |
| 2007/0042332 A1 * | 2/2007 | Leem ...................... G06F 16/68 434/156 |
| 2007/0282786 A1 * | 12/2007 | Block .................. G11B 27/329 |
| 2009/0119543 A1 * | 5/2009 | Driessen ................ G06N 3/004 714/37 |
| 2009/0240671 A1 * | 9/2009 | Torres ..................... G06F 16/93 |

(Continued)

*Primary Examiner* — Sheree N Brown (57) ABSTRACT

A system, method, computer program, and on-line computer site is provided for customizing scripture study to enhance scriptural fluency. The method includes specifying a range of passages from a small assortment to a complete canon of scripture, then randomly generating a passage from within the range, optimizing a study to meet personal goals using interactive features, and producing a study report to save and share with peers for collaboration and feedback. Preferably, the invention is operated in conjunction with an interactive Web site or stand alone software program.

10 Claims, 6 Drawing Sheets

(56) References Cited

U.S. PATENT DOCUMENTS

| | | | |
|---|---|---|---|
| 2010/0083162 A1* | 4/2010 | Hernandez | G06F 1/1616 |
| | | | 715/776 |
| 2010/0293498 A1* | 11/2010 | Maxfield | G06F 3/0219 |
| | | | 715/776 |
| 2011/0066970 A1* | 3/2011 | Burrier | G06Q 30/02 |
| | | | 715/782 |
| 2012/0095993 A1* | 4/2012 | Shau | G06F 16/334 |
| | | | 707/723 |
| 2012/0178066 A1* | 7/2012 | Drum | G09B 5/04 |
| | | | 434/245 |
| 2013/0214487 A1* | 8/2013 | Howard | A63F 3/001 |
| | | | 273/249 |
| 2013/0219326 A1* | 8/2013 | Burrier | G06Q 30/02 |
| | | | 715/780 |
| 2017/0197139 A1* | 7/2017 | McSween | A63F 3/04 |

* cited by examiner

METHOD AND SYSTEM OF CUSTOMIZING SCRIPTURE STUDY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention is broadly directed to education and more specifically to religious study aids or scripture study aids used for educational purposes and enjoyment.

There exist a wide variety of subjects such as math, spelling, grammar, science, and the like, in which study aids are known to improve rate of learning and retention of information. A popular study aid category is scripture study aids, which assist in teaching information contained within religious texts.

Scripture study aids cover a large variety of texts including the Bible, Apocrypha, Tanakh, Qur'an, Veda, Tipitaka and Book of Mormon. For example, in a version of a popular scripture study aid, 1,500 Bible verses are stored in a portable electronic device. By choosing a category, the device then will display corresponding verses. The Life Discipler is adept at teaching passages of scripture that relate by category, but contains only a small sample of the Bible's 31,102 total verses.

Other scripture study aids, such as Ruth's Scripture Treasures and Our Daily Bread Promise Box utilize a deck of cards that contain a Bible verse written on each card. The cards can be sorted into categories or selected randomly to create variety. These study aids are ideal for improving memory, but are also restricted to a small sample of verses.

The above study aids and others of this genre emphasize well-known passages of scripture. While an element of randomness is present, the scope of study never changes. These study aids all help in memorizing certain portions of scripture.

However, there exists a need for dynamic and comprehensive aspects in scripture study, namely, it is needed to randomly select a study passage from any desired number of passages, and after personally optimizing a study of the passage, it is needed to share the results of the study with peers for collaboration and feedback.

BRIEF SUMMARY OF THE INVENTION

The present invention is directed to education, and an object of the invention is to improve rate of learning and retention of scripture in a way that is fun and versatile.

It is another object of the present invention to create unpredictability or randomness as a method to enhance scripture proficiency.

It is another object of the present invention for students to specify a range of scripture from which to randomly select a study passage.

It is another object of the present invention to create an environment for students to optimize their study to achieve personal goals.

It is still another object of the present invention for students to share their study with peers for collaboration and feedback.

To achieve these and other objects, the present invention provides a method, system, and on-line computer site for customizing scripture study. The method broadly includes specifying a desired range of passages, randomly generating a passage from within the range, utilizing resources to optimize the study, and sharing information learned in the study with peers for their collaboration and feedback.

The method of customizing scripture study can be used with all canons of scripture including the Bible, Apocrypha, Tanakh, Qur'an, Vedas, Tipitaka and Book of Mormon.

There are also several ways that a passage of scripture can be defined, examples of which include a verse, a chapter, or a book. Additional options could include defining a passage as a sentence, a paragraph, or other division of text.

Features of the invention can be implemented in numerous ways, including as a system, a method, a computer site, or a computer readable medium (e.g., software program). The invention preferably relies on a communications infrastructure, for example, the Internet, wherein individual interaction is possible. Several embodiments of the invention are discussed below.

As a computer system, part of the invention generally includes a database and a processor unit. The processor unit operates to provide selections from the database of scripture, lexicons, commentaries, and the like to the student in an organized, user friendly manner so that students may select and utilize these resources for their personal study. Moreover, the output may include print or electronic media.

Part or all of the data can also be sent electronically and maintained on a Web server for confidential access with typical browsers. The data may also be transmitted and viewed by other well-known techniques such as Web posts, e-mail, sharing, and the like. The computer site is preferably viewed with a client Web browser through a Web secure server communicating with an application server having a database associated therewith.

As a computer readable medium containing program instructions for customizing scripture study, an embodiment of the invention includes computer readable code devices for interacting with a student as noted above, processing that data, and generating printed or electronic media for that student.

Specifically, the method of customizing scripture study via a graphical user interface (GUI) includes providing an interactive area and a display area of the GUI, wherein the interactive area comprises selectable scripture passages for enabling students to create a range of desired passages from which to randomly generate a study passage, and selectable resources enabling students to optimize their study to be displayed in the display area. Students can select and de-select resources by selecting or de-selecting a corresponding icon. The selected or de-selected resource is shown or removed respectively. The display area automatically adjusts to selections to ensure information is presented clearly and text does not overlap.

The method further includes generating electronic media comprising information corresponding to the study that can be saved and shared with peers for collaboration and feedback. Printed media may also be generated for journaling and filing purposes.

As a computer system for customizing scripture study utilizing a GUI, an embodiment of the invention includes a GUI comprising an interactive area and a display area, wherein the interactive area comprises selectable scripture passages for enabling students to create a range of desired passages from which to randomly generate a study passage, and selectable resources enabling students to optimize their study to be displayed in the display area. Students can select and de-select resources by selecting or de-selecting a corresponding icon. The selected or de-selected resource is shown or removed respectively. A processor responsive to selection of an icon retrieves the corresponding information from the database and arranges the information for display in a predetermined manner to limit obstruction of previously selected study resources.

As a computer readable media containing program instructions for customizing scripture study utilizing a GUI, an embodiment of the invention includes computer instructions for providing an interactive area and a display area of the GUI, wherein the interactive area comprises selectable scripture passages for enabling students to create a range of desired passages from which to randomly generate a study passage, and selectable resources enabling students to optimize their study to be displayed in the display area. Students can select and de-select items by selecting or de-selecting a corresponding icon. The selected or de-selected item is shown or removed respectively. Computer instructions also include retrieving the corresponding information linked to respective icons and arranging the selected information for display in a predetermined manner to limit obstruction of previously selected study resources.

While the study aid is intended for educational purposes, it can also be used to play a game in which players compete in answering questions related to a randomly generated passage.

Other aspects and advantages of the invention will become apparent from the following detailed description taken in conjunction with the accompanying drawings, illustrating by way of example the principles of the invention.

BRIEF DESCRIPTION OF THE SEVERAL VIEWS OF THE DRAWING

The above objects and other advantages of the present invention will become more apparent by describing in detail the preferred embodiments thereof with reference to the attached drawings in which.

While the present invention will be described with reference to the details of the embodiments of the invention shown in the drawing, these details are not intended to limit the scope of the invention.

DETAILED DESCRIPTION OF THE INVENTION

The present invention will now be described more fully with reference to the accompanying drawings, in which preferred embodiments of the invention are shown. The invention may, however, be embodied in many different forms and should not be construed as being limited to the embodiments set forth herein. Rather, the embodiments are provided so that this disclosure will be thorough and complete, and will fully convey the concept of the invention to those skilled in the art.

Broadly described, the present invention relates to customizing scripture study to improve rate of learning and retention of scripture in a way that is fun and versatile.

The present invention provides a system, method, and on-line computer site for students to: 1.) Specify a range of scripture passages. 2.) Randomly generate a passage from within the range. 3.) Personally optimize a study of the passage. 4.) Produce a study report that can be saved and shared with peers for their collaboration and feedback.

In a preferred embodiment, the method and system will utilize an on-line computer site, software application, or a computer readable storage media device for a personal computer or a portable device such as a cell phone or tablet to specify a range of passages, optimize a study, and generate a study report that can be saved and shared. The method also utilizes five dice, including three regular six-sided dice—10, 11 and 12 shown in FIG. 1—and two twelve-sided dice—13 and 14 shown in FIG. 1, as a tactile means of randomly generating a study passage in order to engage students in a fun, hands-on way. Note that instead of dice, other equivalent means of randomly generating a study passage may be employed, including an electronic randomizer. No matter how attained and with what means, the key is each passage of scripture has equal probability to be randomly selected. The method and system can be used for personal study or classroom study.

Preferably, the invention is operated in conjunction with an interactive Web site or stand alone software program. One of the more significant developments in the consumer industry in the recent past has been the embracing of the Internet by students in all aspects of their lives, from personal research to college courses. With the Internet, a student equipped with an appropriately connected computer and a browser, can explore vast amounts of information stored on computers around the world. Navigating (surfing) the Internet/Web is relatively simple, typically requiring only clicking on a computer mouse or touching a screen to move between Web documents, even when the documents are located at separate locations.

HTML (Hypertext Markup Language) is one of the languages used to provide information on the Web. HTML provides a rich lexicon and syntax for designing and creating useful hypertext and hypermedia documents. With HTML, Web designers can describe the format and content of a Web document, which may include, for example, text files, graphic files, and multimedia files. When accessed by a client computer (i.e., the computer local to the browser), the HTML file is transmitted to the client computer of a network such as the Internet and interpreted by the browser.

Users typically interact with computers and pages on the Internet with Graphical User Interfaces (GUIs). A conventional GUI display includes a desktop metaphor upon which one or more icons, application windows, or other graphical objects are displayed. Typically, a data processing system user interacts with a GUI display utilizing a graphical pointer, which the user controls with a graphical pointing device, such as a mouse, or a touch screen which the user controls using a fingertip. For example, depending upon the actions allowed by the active application or operating system software, the user can select icons or other graphical objects within the GUI display by positioning the graphical pointer over the graphical object and depressing a button, or by touching their fingertips to the screen over the graphical object. In addition, the user can typically relocate icons, application windows, and other graphical objects on the desktop utilizing the well-known drag-and-drop techniques. By manipulating the graphical objects within the GUI display, the user can control the underlying hardware and devices and software objects represented by the graphical objects in a graphical and intuitive manner.

A number of software platforms have been developed for multimedia graphical user interfaces for the Web. For example, Flash® by Macromedia is a multimedia interface that lets designers and developers integrate video, text, audio, and graphics into effective experiences. Web designers use Flash® to create beautiful, resizable, and extremely compact navigation interfaces, technical illustrations, long-form animations, and other dazzling effects. Graphics and animation will scale based on the viewer's screen size, providing high-quality viewing.

Figure 1:
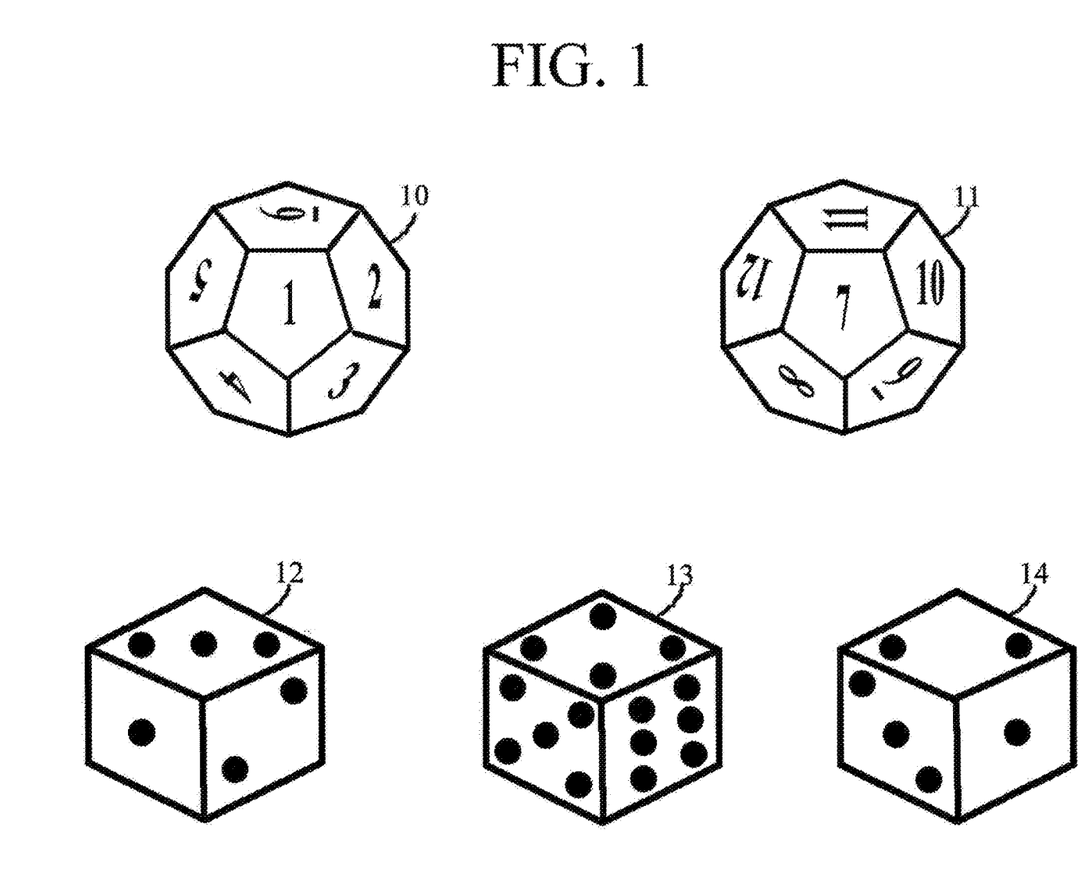
FIG. 1 is a perspective view of three six-sided dice and two twelve-sided dice that may be employed in an embodiment of the invention as a tactile means to randomly generate a study passage.

The present invention generally comprises a multimedia interface for accessing the software application or Web site to specify a range of passages, optimize the study, and produce a study report. The dice in FIG. 1 are integrated as described below as a tactile means of randomly generating a study passage.

Figure 2:
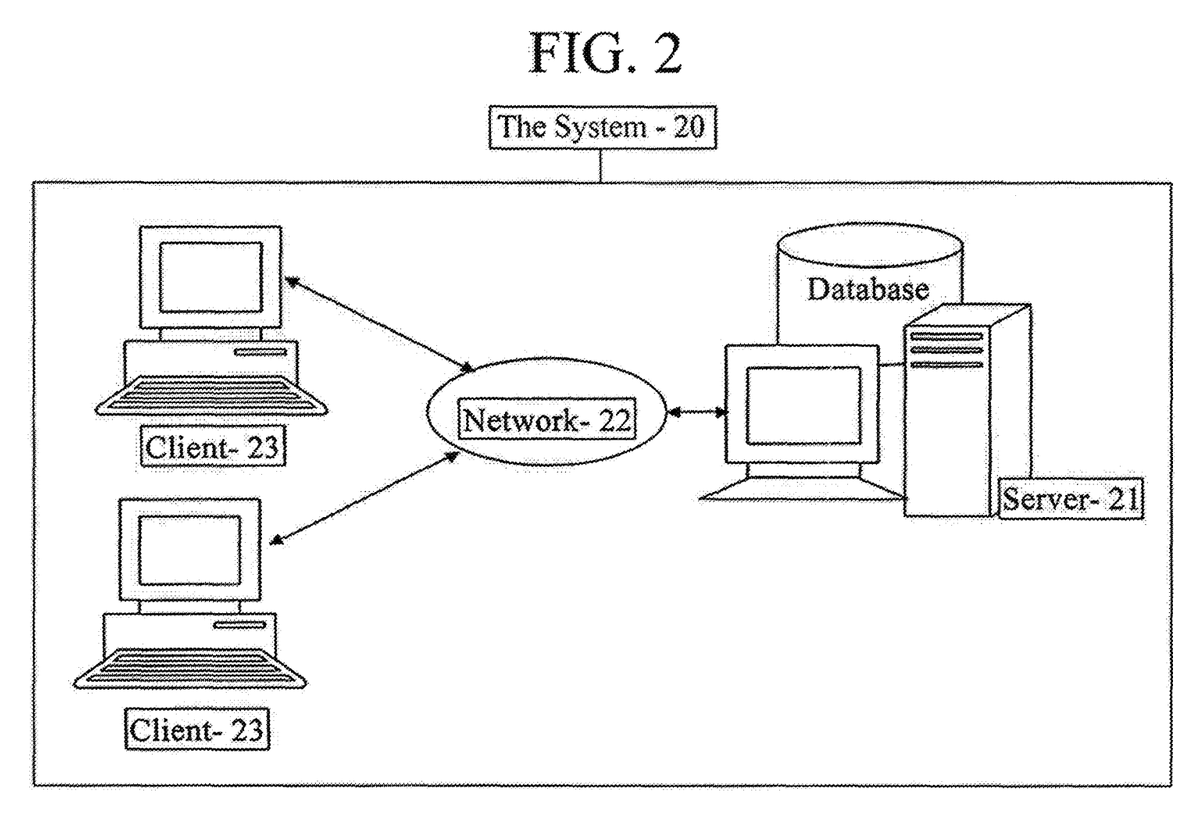
FIG. 2 shows a high level diagram of an exemplary computing system network on which the present invention may be implemented.

FIG. 2 is a high level diagram of an exemplary computing system network on which the present invention may be implemented. The system 20 includes a Web server 21 for storing Web pages, and a client computer 23 capable of accessing the Web pages on server 21. Server 21 may be any number of known computers, or network of computers, capable of hosting a Web site. Similarly, client 23 may be any number of known computers, or network of computers, capable of supporting a Web browser. Server 21 and client 23 are coupled to one another via a network 22, such as the Internet. To retrieve a Web page stored on server 21, the user of client 23 specifies a URL (uniform resource locator). The specified URL allows Web-browsing software running on client 23 to initiate communication with server 21 and access the desired HTML page, which a browser interprets and displays on client 23.

As previously discussed, to view a Web page on client 23, the user specifies, via a URL, the location of the desired Web page. The browser on client 23 then retrieves the HTML file for the specified Web page, interprets the file, and displays it as a Web page.

In a preferred embodiment, the present invention operates similar to standard interactive Web sites with the exception of having the additional unique features of the invention. Preferably, the invention is operated as an interactive multimedia Web site to provide the different features of the invention.

Figure 3:
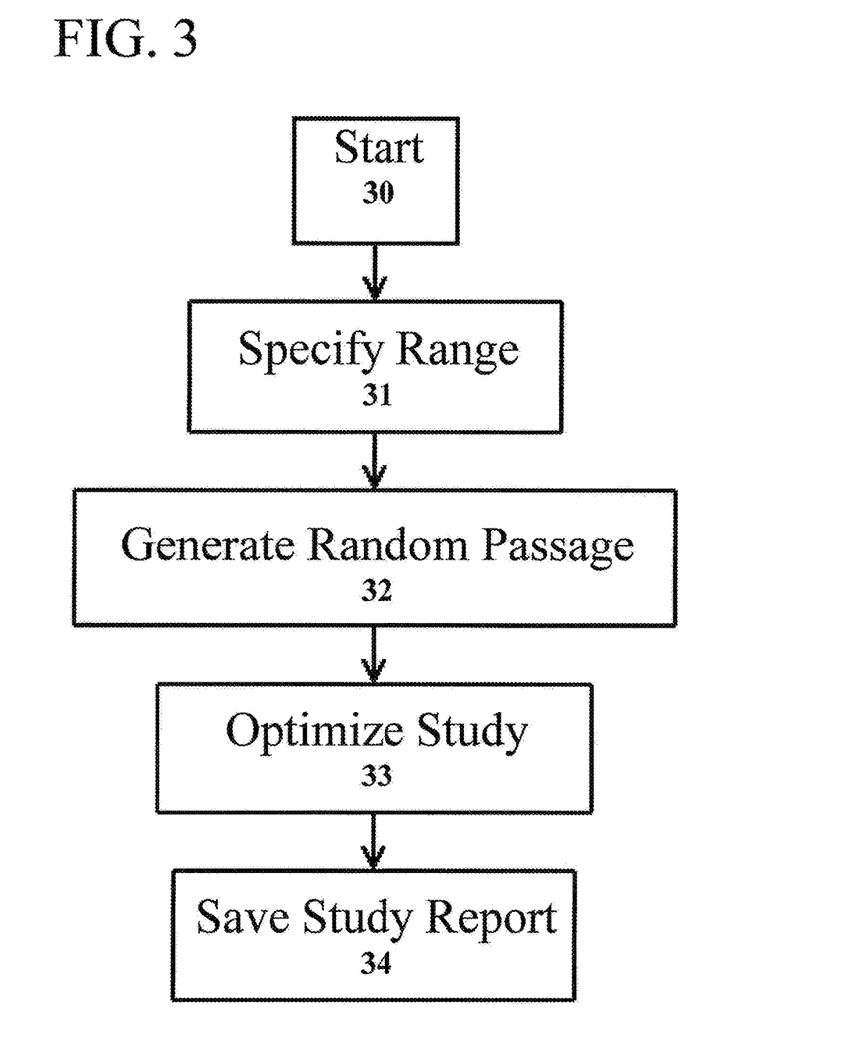
FIG. 3 is a flow chart of the operation of an embodiment of the invention.
Figure 4A:
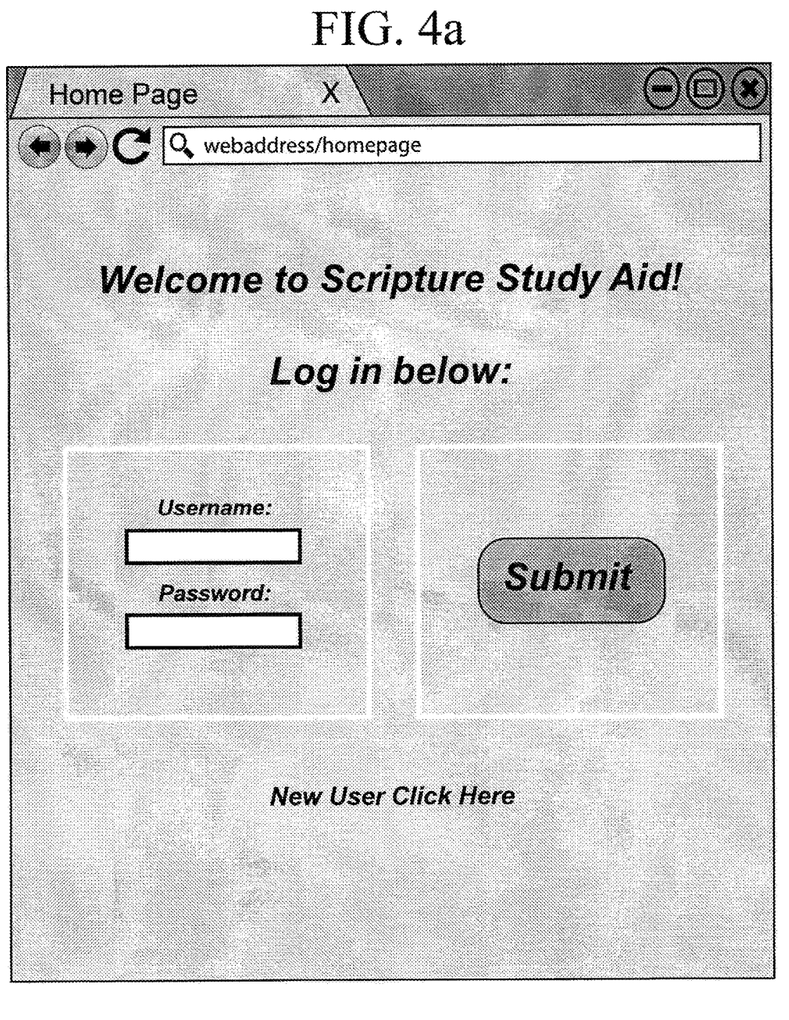
FIG. 4a-4c are sample screen images demonstrating an embodiment of the invention.

Turning now to FIG. 3 a flow chart of the operation of an embodiment of the invention is shown. The operation preferably begins with STEP 30—START. This may comprise an introduction, directions, login, and the like. FIG. 4a is a screen shot of the home page to better give an idea of the graphical user interface.

Figure 4B:
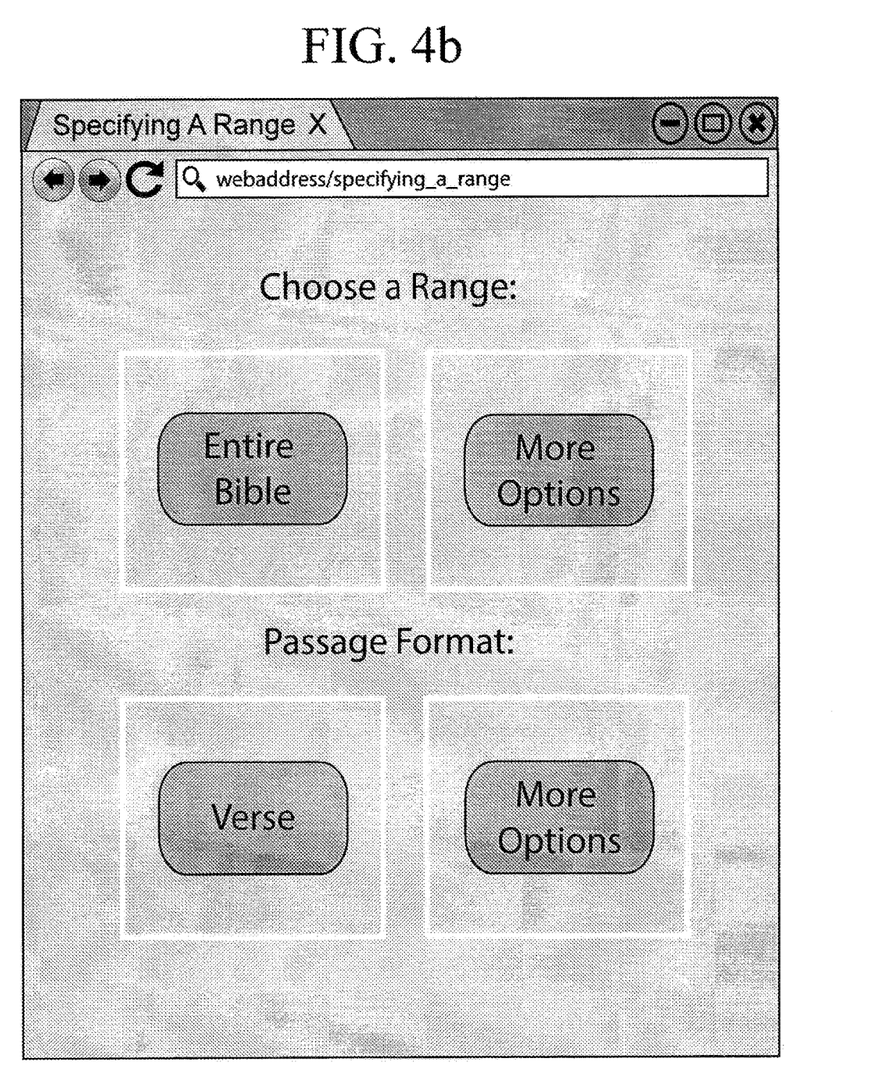

STEP 31—Specify a range of passages. Students choose the passages to include in the range and select a passage format of verse, chapter, or book. FIG. 4b shows the graphical user interface for specifying a range and selecting a passage format.

STEP 32—Randomly generate a study passage. The five dice shown in FIG. 1 are used to randomly generate a reference number from 1-1-1-01-01 to 6-6-6-12-12. The dice are rolled one at a time to arrange them in order. The student enters the reference number into the Web site to display the corresponding study passage. This step is visible within FIG. 4c.

STEP 33—Optimize the study. Students can select from a variety of icons to view commentary, concordance, lexicon and language helps, and other study features.

STEP 34—Save and share study reports. Study reports can be saved in an on-line study log and shared with peers via Web posts and the like for collaboration and feedback. Students are also able to print study reports that can be referred to without accessing a computer.

Following will be several examples to help further explain the method of customizing scripture study.

Figure 4C:
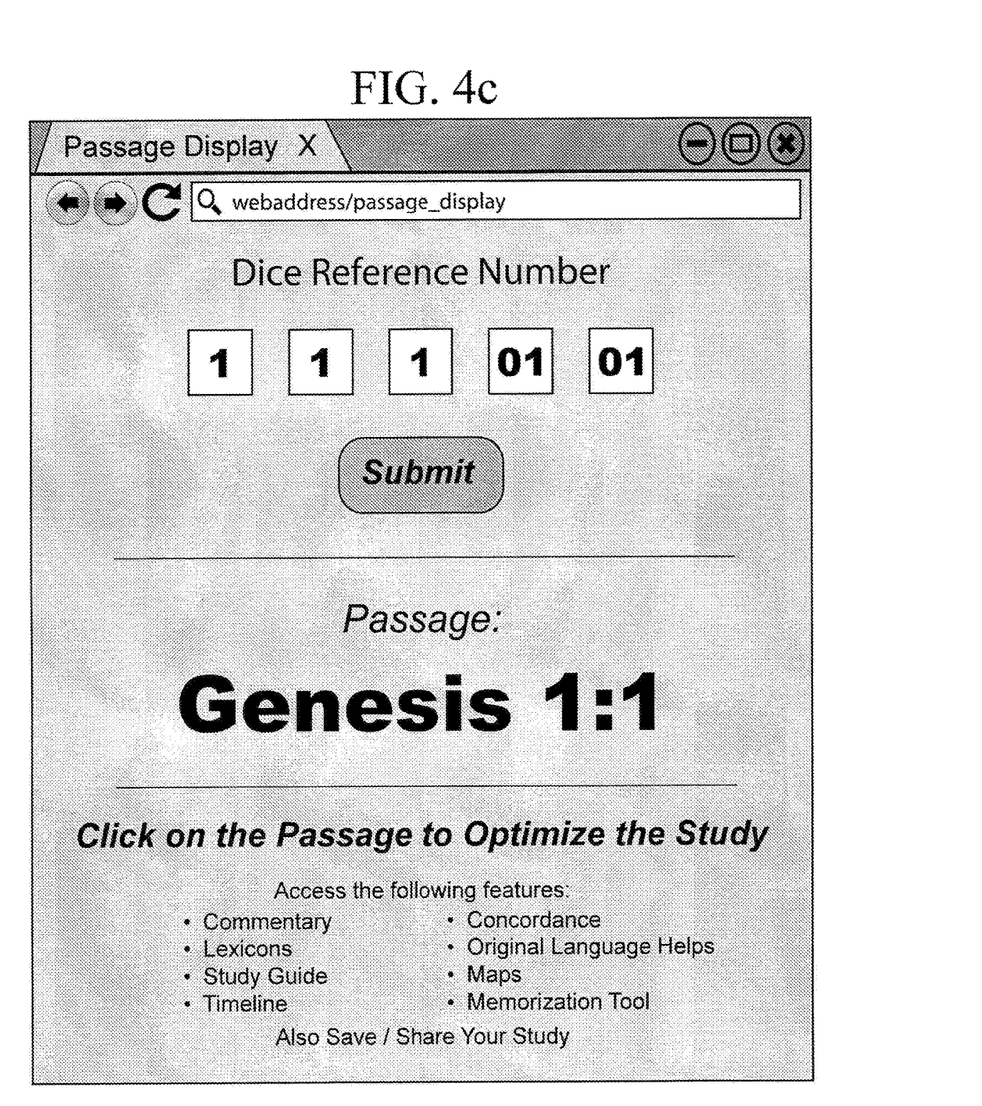

For the first example, the desired range of scripture is the entire Bible and the preferred passage format is verse, as seen in FIG. 4b. This specified range is comprised of 31,102 verses. Next, the student utilizes the five dice pictured in FIG. 1 to randomly generate a study passage. The dice are rolled one at a time, the three six-sided dice first, followed by the two twelve-sided dice. Arranging the dice in the order they are rolled creates a reference number from 1-1-1-01-01 to 6-6-6-12-12. This number is entered into the Web site which will match the reference number to the corresponding passage. For example, if the dice combination is 1-1-1-01-01, the corresponding passage is Genesis 1:1 as shown in FIG. 4c. For illustrative purposes, additional reference numbers and their corresponding passages are provided in the table below.

The reference table beginning with Genesis:

| | |
|---|---|
| 1-1-1-01-01 | Gen. 1:1 |
| 1-1-1-01-02 | Gen. 1:2 |
| 1-1-1-01-03 | Gen. 1:3 |
| 1-1-1-01-04 | Gen. 1:4 |
| 1-1-1-01-05 | Gen. 1:5 |
| 1-1-1-01-06 | Gen. 1:6 |
| 1-1-1-01-07 | Gen. 1:7 |
| 1-1-1-01-08 | Gen. 1:8 |
| 1-1-1-01-09 | Gen. 1:9 |
| 1-1-1-01-10 | Gen. 1:10 |
| 1-1-1-01-11 | Gen. 1:11 |
| 1-1-1-01-12 | Gen. 1:12 |
| 1-1-1-02-01 | Gen. 1:13 |
| 1-1-1-02-02 | Gen. 1:14 |
| 1-1-1-02-03 | Gen. 1:15 |
| 1-1-1-02-04 | Gen. 1:16 |
| 1-1-1-02-05 | Gen. 1:17 |
| 1-1-1-02-06 | Gen. 1:18 |

This is the middle of the reference table corresponding to passages from Psalms:

| | |
|---|---|
| 3-6-6-12-04 | Psa. 102:22 |
| 3-6-6-12-05 | Psa. 102:23 |
| 3-6-6-12-06 | Psa. 102:24 |
| 3-6-6-12-07 | Psa. 102:25 |
| 3-6-6-12-08 | Psa. 102:26 |
| 3-6-6-12-09 | Psa. 102:27 |
| 3-6-6-12-10 | Psa. 102:28 |
| 3-6-6-12-11 | Psa. 103:1 |
| 3-6-6-12-12 | Psa. 103:2 |
| 4-1-1-01-01 | Psa. 103:3 |

-continued

| | |
|---|---|
| 4-1-1-01-02 | Psa. 103:4 |
| 4-1-1-01-03 | Psa. 103:5 |
| 4-1-1-01-04 | Psa. 103:6 |
| 4-1-1-01-05 | Psa. 103:7 |
| 4-1-1-01-06 | Psa. 103:8 |
| 4-1-1-01-07 | Psa. 103:9 |
| 4-1-1-01-08 | Psa. 103:10 |
| 4-1-1-01-09 | Psa. 103:11 |

The conclusion of the table ending with Revelation:

| | |
|---|---|
| 6-6-6-11-07 | Rev. 22:6 |
| 6-6-6-11-08 | Rev. 22:7 |
| 6-6-6-11-09 | Rev. 22:8 |
| 6-6-6-11-10 | Rev. 22:9 |
| 6-6-6-11-11 | Rev. 22:10 |
| 6-6-6-11-12 | Rev. 22:11 |
| 6-6-6-12-01 | Rev. 22:12 |
| 6-6-6-12-02 | Rev. 22:13 |
| 6-6-6-12-03 | Rev. 22:14 |
| 6-6-6-12-04 | Rev. 22:15 |
| 6-6-6-12-05 | Rev. 22:16 |
| 6-6-6-12-06 | Rev. 22:17 |
| 6-6-6-12-07 | Rev. 22:18 |
| 6-6-6-12-08 | Rev. 22:19 |
| 6-6-6-12-09 | Rev. 22:20 |
| 6-6-6-12-10 | Rev. 22:21 |
| 6-6-6-12-11 | Roll Again |
| 6-6-6-12-12 | Roll Again |

Note: Because the five dice create a total of 31,104 reference numbers, and the entire Bible has a total of 31, 102 verses, the last two reference numbers display "Roll Again" to create equal probability.

After randomly generating a study passage, students can select from a variety of resources to optimize the study to meet personal goals, including viewing commentaries, accessing a lexicon to define words, viewing a list of related passages, viewing maps, timelines, making journal notes of information learned, and utilizing a scripture memorization tool. Other resources can be added to the Web site based on user demand.

Students are also able to save their study including any personal study notes on the Web site and can share their findings with peers for collaboration and feedback. A study report can also be printed for off-line journal keeping that can be referred to without accessing a computer.

Below are additional examples of a variety of specified ranges to show how the Web site minimizes "Roll Again" outcomes while maintaining equal probability.

Example 2

The range is the first four books of the New Testament: Matthew, Mark, Luke and John, and the passage format is verse, a total of 3,779 verses. In this illustration, 8 reference numbers correspond to each verse. For example: the numbers 1-1-1-01-01, 1-1-1-01-02, 1-1-1-01-03, 1-1-1-01-04, 1-1-1-01-05, 1-1-1-01-06, 1-1-1-01-07, 1-1-1-01-08, all correspond to Matthew 1:1; and the numbers 1-1-1-01-09, 1-1-1-01-10, 1-1-1-01-11, 1-1-1-01-12, 1-1-1-02-01, 1-1-1-02-02, 1-1-1-02-03, 1-1-1-02-04, all correspond to Matthew 1:2, and so on. In this example, the remaining 872 of the 31,104 reference numbers will display "Roll Again." In this way, all passages in the range maintain equal probability of being randomly selected.

Example 3

Now the range is the first five books of the Old Testament: Genesis, Exodus, Leviticus, Numbers, and Deuteronomy, and the passage format is chapter, a total of 187 chapters. In this example, 166 reference numbers correspond to each of the 187 chapters, with 62 remaining numbers displaying "Roll Again."

Example 4

The range is the entire Bible, and the passage format is book, a total of 66 books. For this example 471 reference numbers correspond to each of the 66 books, with only 18 remaining numbers displaying "Roll Again." The key is all passages in the range always maintain equal probability of being randomly selected.

While the examples above define a passage as a verse, chapter and book, additional options could include defining passages as a sentence, paragraph, or other division of text. The benefit of the dice is a tactile, hands-on element added to the study aid. However, an electronic randomizer or other means of randomly generating a study passage could be employed.

The present invention achieves several unique and synergistic features as hereafter described. First and foremost, the invention provides a method which facilitates a spontaneous devotional study. Randomizing the study passage ensures that a variety of scripture is learned by increasing exposure to familiar and unfamiliar passages. The dice provide a hands-on aspect that engages the study in a unique way. By including the entire Bible, the invention demonstrates the breadth and scope of the complete text while enhancing ability to navigate through the different books of the Bible. By specifying a range of passages a student can focus on particular sections of interest. Optimizing the study enables students to use resources which are relevant to current study goals. Saving and sharing the study enables valuable collaboration and feedback from peers.

In addition to the previously stated advantages, the present invention is also ideal to be used in a multi-player game, on-line or in person, in which players compete in answering questions related to a particular randomly generated passage. Players would specify a range of passages and roll the dice as described above or utilize an electronic randomizer to maintain a faster rate of play. To earn points, questions would need to be answered about the passage. Some examples of questions are: Who is quoted? What is being addressed? When did the passage occur? Easier questions could also be answered by novice players such as determining if the passage is from the Old Testament or New Testament. Players could earn points for correctly answering questions. A player who attains a certain score, for example 50 points, could be declared the winner.

Scripture study aids continue to be a growing industry and there is always a need for new inventions that students will enjoy and continue to use. It is important that any new study aid be easy to understand and versatile to accommodate diverse goals. It is necessary to ensure that personal goals are kept and skill levels are accommodated from beginner to expert.

It will be readily appreciated that the principles of the invention may apply to other computer applications, such as other mainframes, minicomputers, network servers, supercomputers, personal computers, or workstations, as well as other electronics applications. Therefore, while the discussion herein focuses on a particular application, it should be understood that the invention is not limited to the particular hardware designs, software designs, communications protocols, performance parameters, or application-specific functions disclosed herein.

The invention can also be embodied as computer readable code on a computer readable medium. The computer readable medium is any data storage device that can store data, which thereafter can be read by a computer system. Examples of computer readable medium include read-only memory, random-access memory, CD-ROMs, DVDs, magnetic tape, optical data storage devices. The computer readable medium can also be distributed over network coupled computer systems so that the computer readable code is stored and executed in a distributed fashion.

Based on the foregoing specification, the invention may be implemented using computer programming or engineering techniques including computer software, firmware, hardware, or any combination or subset thereof. Any such resulting program, having computer-readable code means, may be embodied or provided within one or more computer-readable media, for example, a fixed (hard) drive, diskette, optical disk, magnetic tape, semiconductor memory such as read-only (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, or any sub-components of one or more processing systems, including software, firmware, hardware, or any combination or subset thereof, which embody the invention as set forth in the claims.

User input may be received from the keyboard, mouse, touch screen, pen, voice, or any other means by which a human can input data to a computer, including through other programs such as application programs.

One skilled in the art of computer science will easily be able to combine the software created as described with appropriate general purpose or special purpose computer hardware to create a computer system or computer subsystem embodying the method of the invention.

While the present invention has been described in detail with reference to the preferred embodiments thereof, it should be understood to those skilled in the art that various changes, substitutions and alterations can be made hereto without departing from the scope of the invention as defined by the appended claims.

What is claimed is:

1. A method of customizing scripture study via a graphical user interface comprising:
   providing a graphical user interface having at least two distinct areas comprising an interactive area and a display area, wherein the interactive area comprises text entry, selectable passages, and links to study resources;
   saving and outputting information after implementing the following steps:
   (a) specifying a range of scripture which includes:
      (i) selecting a plurality of passages varying from a small assortment of passages to a complete canon of scripture;
      (ii) selecting a passage format of verse, chapter, or book;
   (b) randomly generating by a computer processor a study passage which includes;
      (i) assigning a reference number to each passage;
      (ii) using dice to randomly generate a reference number;
      (iii) matching dice reference number using a reference table;
   (c) said computer processor optimizes the study of the random study passage by linking to various resources such as a commentary, lexicon, study guide, timeline, concordance, original language helps, maps, and a memorization tool;
   (d) storing in a database said study passage including said reference table with said matched dice reference number;
   (e) transmitting over a network a study report including said reference table with said matched dice reference number.

2. The method of claim 1, wherein details of the study are saved and output to electronic media.

3. The method of claim 2, further comprising communicating the electronic media to peers for collaboration and feedback.

4. The method of claim 1, wherein details of the study are saved and output to printed media.

5. The method of claim 1, wherein said passage is defined to include by paragraph, sentence, or other division of text.

6. The method of claim 1, wherein said canon of scripture includes one or more of the Bible, Apocrypha, Tanakh, Qur'an, Veda, Tipitaka and Book of Mormon.

7. The method of claim 1, wherein an electronic randomizer is used to randomly generate a reference number.

8. The method of claim 1, further comprising playing a game where players compete in answering questions related to a randomly generated passage.

9. A computer system for customizing scripture study via a graphical user interface comprising:
   a graphical user interface having at least two distinct areas comprising an interactive area and a display area, wherein the interactive area comprises text entry, selectable passages, and links to study resources;
   a database for storing data relative to every scripture passage, comprising of links to various resources such as a commentary, lexicon, study guide, timeline, concordance, original language helps, maps, and a memorization tool;
   a processor for saving and outputting information after implementing the following steps:
   (a) specifying a range of scripture which includes:
      (i) selecting a plurality of passages varying from a small assortment of passages to a complete canon of scripture;
      (ii) selecting a passage format of verse, chapter, or book;
   (b) randomly generating by a computer processor a study passage which includes;
      (i) assigning a reference number to each passage;
      (ii) using dice to randomly generate a reference number;
      (ill) matching dice reference number using a reference table;
   (c) said computer processor optimizes the study of the random study passage by linking to various resources such as a commentary, lexicon, study guide, timeline, concordance, original language helps, maps, and a memorization tool;

(d) storing in a database said study passage including said reference table with said matched dice reference number;

(e) transmitting over a network a study report including said reference table with said matched dice reference number.

10. A computer readable storage media device containing program instructions for customizing scripture study via a graphical user interface comprising:

computer instructions for providing a graphical user interface having at least two distinct areas comprising an interactive area and a display area, wherein the interactive area comprises text entry, selectable passages, and links to study resources;

computer instructions for saving and outputting information after implementing the following steps:

(a) specifying a range of scripture which includes:
  (i) selecting a plurality of passages varying from a small assortment of passages to a complete canon of scripture;
  (ii) selecting a passage format of verse, chapter, or book;

(b) randomly generating by a computer processor a study passage which includes;
  (i) assigning a reference number to each passage;
  (ii) using dice to randomly generate a reference number;
  (iii) matching dice reference number using a reference table;

(c) said computer processor optimizes the study of the random study passage by linking to various resources such as a commentary, lexicon, study guide, timeline, concordance, original language helps, maps, and a memorization took;

(d) storing in a database said study passage including said reference table with said matched dice reference number;

(e) transmitting over a network a study report including said reference table with said matched dice reference number.

* * * * *